United States Patent [19]
Miserlis et al.

[11] 3,803,005
[45] Apr. 9, 1974

[54] METHOD FOR RECOVERY OF TRICHLORETHYLENE FROM OIL WASTE BY PLURAL STAGE DISTILLATION

[75] Inventors: John G. Miserlis, Lowell; Arthur Petrou, Haverhill, both of Mass.

[73] Assignee: Silresin Chemical Corporation, Lowell, Mass.

[22] Filed: Oct. 1, 1971

[21] Appl. No.: 185,529

[52] U.S. Cl............... 203/84, 203/85, 203/96, 203/97, 203/98, 260/652 P
[51] Int. Cl............................................ C07c 19/02
[58] Field of Search................. 203/84, 85, 96–98, 203/90, 40; 260/652 P, 654 S

[56] References Cited
UNITED STATES PATENTS

| | | | |
|---|---|---|---|
| 3,448,016 | 6/1969 | Hoppe | 260/652 P |
| 2,991,298 | 7/1961 | Raffaeta | 203/85 |
| 2,799,716 | 7/1957 | Brummet | 260/654 S |
| 3,065,279 | 11/1962 | Bohl et al. | 260/652 P |
| 2,487,184 | 11/1949 | Rupp | 203/97 |
| 3,003,930 | 10/1961 | Pugh et al. | 203/98 |
| 3,296,240 | 1/1967 | MacDonald et al. | 203/96 |
| 3,007,578 | 11/1961 | Wride et al. | 203/98 |
| 1,986,431 | 1/1935 | Gray | 203/97 |

*Primary Examiner*—Wilbur L. Bascomb, Jr.
*Attorney, Agent, or Firm*—Richard L. Stevens

[57] ABSTRACT

A process for removing trichlorethylene solvents from a degreasing plant sludge oil mixture, which process comprises: employing an evaporation two-stage stripping operation to include a directly contacted heat interchange involving recirculation of a liquid oil solvent stream to avoid exceeding the critical decomposition temperature of the trichlorethylene, which process provides for the separation of solvent-free oil containing less than 50 parts per million solvent, the separation and recovery of the trichlorethylene solvent.

30 Claims, 1 Drawing Figure

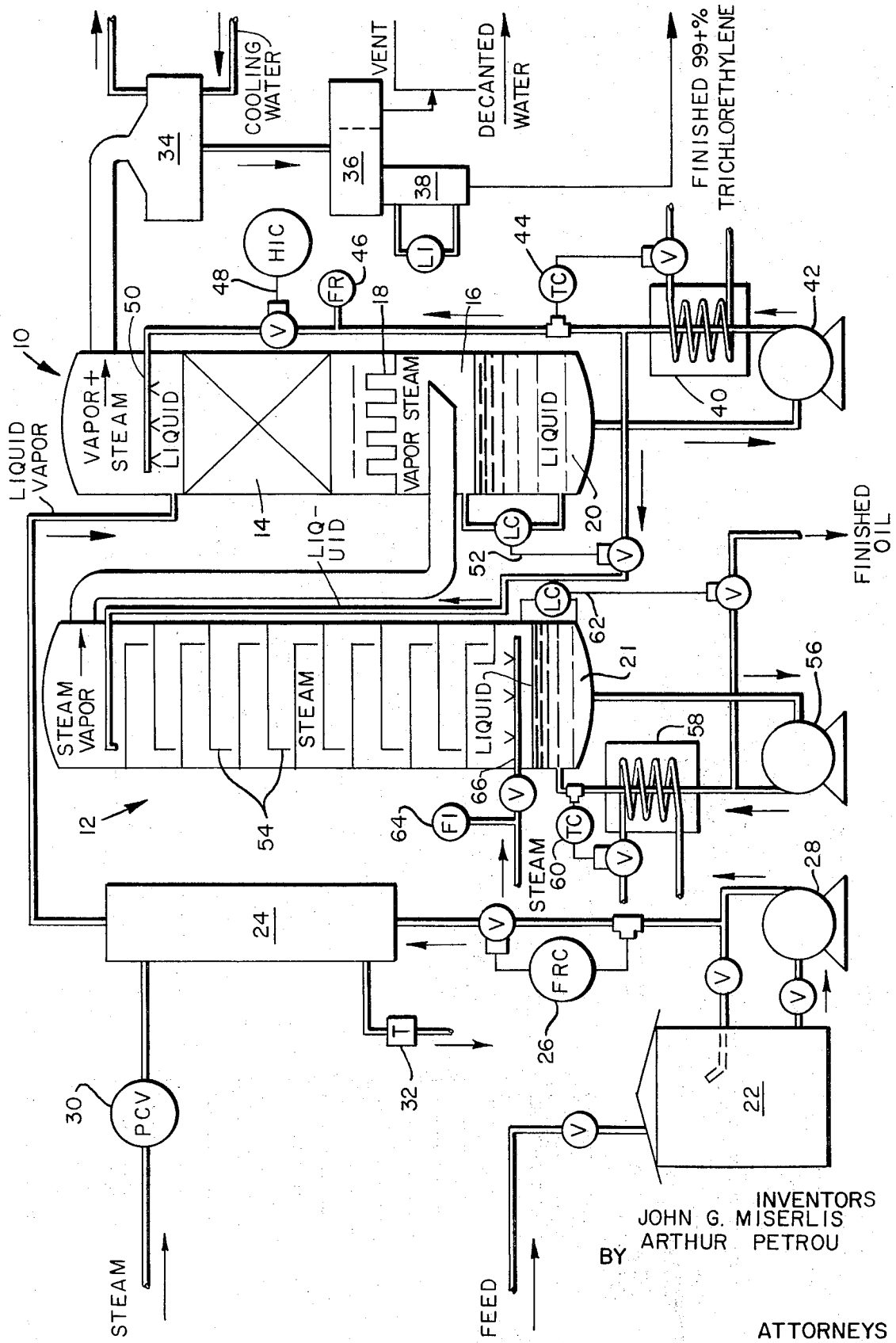

METHOD FOR RECOVERY OF TRICHLORETHYLENE FROM OIL WASTE BY PLURAL STAGE DISTILLATION

BACKGROUND OF THE INVENTION

There are a number of industrial processes by which halogenated compounds are employed as cleaning or degreasing solvents, or otherwise become admixed with high-boiling-point liquid compounds, such as oils. For example, in the metal processing industry, oil-contaminated metal parts are often degreased through the employment of halogenated compounds, such as trichlorethylene, perchlorethylene, carbon tetrachloride or fluorocarbons, chloro-carbons or chlorinated or fluorinated hydrocarbons. After use, the halogenated compounds become contaminated with waste products and industrial oils from the parts which are degreased and form an oil-halogenated sludge mixture which often contains from 40 to 90 percent volume of the halocarbon. In addition, halocarbons are also employed in dry-cleaning operations where such halocarbons also can become contaminated with a wide variety of waste products and oils, as well as in other industrial solvent or vapor extraction processes. The oil halocarbon mixtures have, in the past, been discarded as waste products; however, the discharge of such material as waste products serves as a pollutant in the waterways of the nation.

It would be desirable to provide a process for the separation of the halocarbons from the contaminating oil and waste products. However, for example, the recovery of trichlorethylene from hydrocarbon oils has not been effective enough to render the discharged oil free of trichlorethylene. The primary difficulty associated with the present methods of recovery and separation, particularly the trichlorethylene, is due, in part, to the heat sensitivity of halocarbons at elevated temperatures. For example, trichlorethylene has a critical decomposition temperature which, when exceeded in the presence of air or moisture, may induce violent explosions or give off toxic gases. The critical decomposition temperature of trichlorethylene depends on pressure, the amount of oxygen and moisture present, as well as the type and quantity of stabilizers, inhibitors, and other additives present. Typically, the critical decomposition temperature of trichlorethylene is about 265°F at atmospheric pressure. A similar problem concerning heat sensitivity and decomposition temperatures also affects other halocarbons. Due to such decomposition temperatures, any processes for the separation and recovery of the halocarbon from such mixtures must be carried employing suitable safety devices and at relatively low temperatures. Such operating restrictions have, in the past, resulted in the employment of such low temperatures that separation of the halocarbon and the oil is not efficient enough, either in single or multiple evaporation systems, to recover or remove the oil or the halocarbon in sufficient quantity and purity to make such processes economical or to provide for the reuse of the halocarbon or oil. Accordingly, there exists the need for a process which would separate and recover simply, economically, and efficiently trichlorethylene hydrocarbon oil waste sludge mixtures.

SUMMARY OF THE INVENTION

Our invention relates to a process and apparatus for the separation and recovery of halocarbons from mixtures containing high boiling point liquids, such as industrial and processing oils. The invention includes a method and apparatus for imparting to a liquid stream from which the solvent is to be removed thermal energy and at the same time contacting the liquid stream with a carrier fluid which fluid is immiscible with the solvent to be removed to lower the partial pressure of the solvent such that it may be substantially removed from the liquid stream without thermal degradation of the solvent to be removed. The invention in a particularly preferred embodiment includes removing a portion of a stripped liquid stream, imparting thermal energy to the liquid stream, recycling the liquid stream, and contacting the incoming liquid stream containing the solvent to be removed with the recycled heated liquid stream and at the same time contacting the incoming liquid stream with a carrier fluid such as steam to lower the partial pressure and thus remove the solvent from the incoming liquid stream by steam distillation.

In particular, our process concerns the recovery of a halocarbon, such as trichlorethylene, from a degreasing plant sludge oil mixture, which process provides for the efficient and economical recovery and separation of the oil containing less than, for example, 100 parts per million of the halocarbon, and the efficient recovery of the halocarbon without exceeding the decomposition temperature of such halocarbon. More particularly, our invention is directed to a process for the separation and recovery of trichlorethylene from a degreasing plant waste sludge oil-trichlorethylene solvent mixture or feed stream, forming a vapor and a liquid stream of the feed stream, and recycling a portion of the liquid stream within the same distillation stage at a rate and in an amount to provide a heat input to the incoming feed stream which effects an evaporation of the bulk of the trichlorethylene solvent within the first evaporation stage, permitting efficient separation of the trichlorethylene at a temperature of less than about 240°F.

According to this invention a first distillation stage is supplied with a normally highly concentrated solvent-oil feed stream at atmospheric pressure and equilibrium temperature and is evaporated prior to introduction into the first stage flash chamber. A recirculation liquid stream taken from the first stage bottoms has thermal energy imparted thereof, is recycled into the first stage, and provides sufficient heat input to effect the bulk removal of solvent. This way the necessary heat input required for partial distillation of the bulk of the solvent from the feed stream is contained as heat content in the large mixed stream entering the first stage.

Our invention comprises in a preferred embodiment a process for the separation and recovery of a halocarbon and oil from a concentrated waste sludge mixture of such halocarbon and oil, the halocarbon subject to decomposition at elevated temperatures, which process includes: evaporating a concentrated halocarbon-hydrocarbon oil sludge mixture to form a vapor-liquid stream; introducing the vapor-liquid stream into a first stage distillation column, the column divided into an upper vapor portion and a lower liquid portion, the vapor-liquid stream being introduced into the upper vapor portion of the column to provide a first vapor stream and a first liquid stream; introducing a portion of the first liquid stream into a second distillation column having an upper vapor portion and a lower liquid portion to provide a second vapor stream and a second liquid stream; recovering as a liquid bottom stream from the second column the oil; introducing the second vapor stream into the lower vapor section of the first distillation column to admix said stream with the first liquid stream in said lower liquid section; removing a vapor stream comprising the first and second vapor streams from the upper vapor section of the first distillation column, the stream containing essentially water and halocarbon; condensing the vapor stream containing the water and halocarbon removed from the upper vapor section of the first column; recovering the halocarbon from said condensed mixture; removing and heating a portion of the first liquid stream; and recycling a portion of the first liquid vapor stream from the liquid section of the first distillation column to the vapor section of the first distillation column, the rate and amount of recycling sufficient to provide the heat input to a majority of the halocarbon introduced into the upper vapor section of the first distillation column without exceeding the decomposition temperature of the hydrocarbon in such vapor section.

It is essential in the practice of our invention to maintain a sufficient amount of a recycling or recirculation of the liquid stream from the first stage distillation in order to provide a suitable heat input to the upper vapor stage so as to distill a majority of the halocarbon in that stage, and yet permit the halocarbon to remain below its critical decomposition temperature. Typically, our process is carried out by employing a multiple number of distillation stages, e.g., first and second stage distillation columns, and introducing into the first column a vapor-liquid stream of the halocarbon-oil mixture. Where the halocarbon content of the liquid-vapor feed stream introduced into the first stage distillation column is high, then the recycling stream rate of the liquid stream from the same column is increased proportionately in order to provide greater heat input to the upper section of the column in order to sufficiently vaporize the halocarbon. Similarly, where the halocarbon content of the feed stream introduced into the first stage column is low, the recycling rate may be correspondingly decreased.

In our process, the recycling rate is adjusted as required, depending on the particular halocarbon-oil mixture to be separated and recovered, in order to satisfy the heat input requirements to provide sufficient distillation in the first stage column and yet to remain below the particular critical decomposition temperature of the halocarbon being recovered. The critical decomposition temperatures of halocarbons vary in the particular recycling rate to be employed, and will, accordingly, vary depending on the halocarbon to be recovered. With, for example, the trichlorethylene, the recycling rate should be sufficient so that the maximum temperature of any heated surface in the process should not be allowed to exceed, for example, 240°F, which temperature is below the temperature wherein substantial decomposition reaction would occur, which would be 265°F. Further, in our process for the separation and recovery of trichlorethylene, our process permits the operating temperatures of the bulk liquids and vapors in the evaporation and distillation and stripping operations to be carried out between 80° and 240°F, depending upon the absolute pressure of the system.

Our process is to be described in particular in reference to trichlorethylene and its recovery from degreasing plant oil sluge mixtures which mixtures may or may not contain water. However, it is recognized that our process may be employed in the recovery and/or separation of a variety of heat-sensitive materials; that is, mixtures containing materials subject to decomposition at elevated temperatures, particularly in the efficient and economic recovery of halocarbons employed as solvents, degreasers, drycleaning liquids, solvent extractors and the like, and which mixtures may or may not include water. Typical halocarbons would include, but not be limited to, carbon tetrachloride, perchlorethylene, perfluoroethylene, perchloropropylene and other $C_2$–$C_3$ chlorinated and fluoronated compounds, as well as fluorocarbons and chlorocarbons, such as trichloromonofluoromethane, dichlorodifluoromethane, monobromotrifluoromethane, trichlorotrifluoroethane, dichlorotetrafluoroethane, octofluorocyclobutane, as well as other $C_2$–$C_8$ fluoro, bromo and chlorinated compounds. Other halocarbons would include the chloro, fluoro, and bromo hydrocarbons, such as trifluoroethylene, trichlorethylene, dichlorethylene, and the like, and other compounds which, for example, in temperatures in excess of 350°F in the presence of metal or other materials, decompose to give off toxic acids or to form, alone or with other compounds, explosive or toxic mixtures or vapors.

The halocarbon-oil mixtures which may be separated in our process include those mixtures wherein the halocarbon may be present in amounts of 10 to 90 percent; for example, 50 to 90 percent by volume of the mixture. Such mixtures should be fluids suitable for processing or semifluid, and if not, suitable solvents or the like may be added to impart the desired viscosity for processing.

Where required, a desired preprocessing operation treatment may be carried out, such as filtering or desludging operations to remove metal chips, grit or solid or gelled particles prior to treating the halocarbon-oil mixture in our process. The halocarbon may be admixed with any type of oil which typically has a higher boiling point, say, from 50° to 100°F higher than the halocarbon in the admixture. Such oils would include petroleum, mineral or hydrocarbon oils derived from petroleum which are employed often with various additives as cutting or cooling or lubricant oil on metal parts, soluble oils, fatty oils which are glycerol esters derived from vegetable or animal fats, or similar materials, such as coconut oil, olive oil, peanut oil, shell oil, lard oil, and the like, as well as oils derived from plants which may include esters and terpene-type hydrocarbons. Such oils would also include oil mixtures of sulfonated fatty oils and mineral oils which oil mixtures may have a molecular weight range from 400 to 600 and a boiling point range of from 600° to 700°F, and soluble oils or emulsifying oils, such as potassium and sodium petroleum sulfonates. For example, our process may be employed in the separation of halocarbons from oil, such as esters like phthalate adipates, sebacates and the like employed as plasticizers.

BRIEF DESCRIPTION OF THE DRAWING

The drawing is a process flow block diagram of the preferred embodiment of the invention.

DESCRIPTION OF THE PREFERRED EMBODIMENT(S)

Referring to the drawing, the first and second stage distillation columns, respectively, are shown at 10 and 12. The first stage is divided into upper and lower sections 14 and 16. The upper section is comprised of a packed heat exchange section and the lower section includes a tray 18 and a liquid holdup section 20. Feed from storage tank 22 enters a preevaporator 24 under pumped flow control 26, by pump 28 and leaves the evaporator 24 as a mixed liquid-vapor stream. The steam to the evaporator is controlled by the pressure control valve 30 and the condensate leaves the evaporator through steam trap 32.

The liquid-vapor stream enters the first stage distillation column 10, where it is disengaged into a liquid stream and vapor stream. The solvent vapor mixes with steam and trichlorethylene vapor that is coming from the bottom section 16 and which travels upwardly through the packed section 14 of the first distillation column 10. The steam and trichlorethylene vapor enter the shell side of a water-cooled shell and tube condenser 34 and the two-phase liquid trichlorethylene water system enters decanter 36. The heavier trichlorethylene phase leaves the boot of the decanter 38 as finished 99 percent + trichlorethylene product; and the lighter water phase leaves the top of the decanter.

The liquid which disengaged from the vapor-liquid mixture entering section 14 drops onto distillation tray 18 where it blends with a recirculation stream that has drained down from the packed section above it, and by that time is brought up to a suitable temperature. Stripping steam bubbles through the liquid and carries out a substantial quantity of the dissolved trichlorethylene. The liquid then drops through the downcomer into the liquid holdup section 20 of the first distillation column 10. The liquid in section 20 then pumped through a shell and tube heat exchanger 40 by pump 42 where a sufficient amount of heat is transferred into it to provide the heat for the first distillation column 10. The quantity of steam required is controlled by the temperature indicator controller 44. The bulk of the heated liquid, whose flow is recorded by a flow recorder at 46, flows through a hand control valve 48 into a nozzle header 50, where it is sprayed onto the top of the packed section 14 of the first distillation column 10.

A bleed stream is removed from this column 10 through a liquid level controller 52 and serves as feed for the second stage distillation column 12. This feed enters the second stage distillation column and drops down through a suitable number of distillation trays 54 or a suitable type of packing. The liquid which has accumulated at the bottom of this column is now stripped of substantially all of the trichlorethylene solvent, and is recirculated by pump 56 through a shell and tube heat exchanger 58 to provide the heat for the second stage distillation column 12. The quantity of heat transferred is controlled by temperature controller 60. Oil which has been stripped of trichlorethylene to the required levels is removed from the system through liquid level controller 62.

Stripping steam flowing through flow indicator 64 enters the bottom of the second stage distillation column 12 through a sparging system 66 and effects the required stripping. The steam and trichlorethylene vapor which is produced travels upwardly countercurrent to the liquid through the second stage distillation column 12. The steam and trichlorethylene vapor generated leave the top of the second stage distillation column 12 and enter section 16 of the first stage distillation column 10. The steam and trichlorethylene vapor bubble through the distillation tray 18 of the first distillation column 10, reclaiming more trichlorethylene vapor, and meet with the trichlorethylene vapors that were generated in the evaporator 24 and disengaged from the liquid in the first stage distillation column. These vapors thus comprise the stream which leaves the top of this column.

Other modifications which may be successfully employed with our invention is the elimination of the preevaporator 24 prior to introduction of the feed stream into the first stage evaporator; or if desired, a preheater rather than a preevaporator may be used whereby there will be no evaporation of the feed stream prior to its discharge into the first stage evaporator wherein the temperature of the feed stream or the sensible heat imparted thereto may be just below the critical temperature of the solvent to be removed. Further, if desired, the first stage column may be operated under vacuum whereby the feed stream, whether preevaporated and/or preheated or any combination thereof, may be flashed upon discharge into the first column.

The apparatus comprising the first and second distillation stages may be mounted superimposed for removal of the trichlorethylene with a recycle line for return of the first stage bottoms to the second stage as feed and the vapor line from the second stage leading directly into the first stage, either through an external vapor line or directly through the top vapor head of the second stage into the first stage.

The invention has been described with reference to trays and/or packing materials, and it is understood that any trays or packing materials well known in the art may be used which will effectuate the purposes of this invention; that is, bubble cap trays, sieve trays, valve trays, etc., may be used as well as the the various type packing materials available to include saddles, rings, etc. Further, the evaporators and heat exchangers used may be of any conventional construction suitable for the purposes of the invention and the preevaporator 24 may, in addition to being a tubular evaporator, include wiped film evaporators, rising or falling film evaporators, multiple effect evaporators, etc.

The tray 18 in the column 10 may be any type of support tray as desired or may include a plurality of trays. The liquid holdup section 20 of the column 10 may also be a reboiler and such reboiler may function alone or in combination with the heat exchanger 40. Further, if desired, in addition to the vapor stream from the second stage column 12 which enters the zone 16 of the first column 10, a separate stream of steam superheated or at any temperature as long as the ultimate temperature is less than the critical temperature of the solvent being removed may be introduced into the column 10 at any point but preferably at approximately the same area where the vapor stream from the second stage is introduced. It may be introduced into the same conduit as the vapor stream from the column 12, but preferably would be introduced separately into the zone 16. Further, the vapor stream from the second stage column 12 may be heated; but, of course, the temperature to which it would be heated would be limited to some temperature below the critical temperature of the solvent being carried in the vapor stream which comprises the vapors of the solvent being recovered and the steam originally introduced into the first stage column 10. With the addition of a separate steam line into the first stage column 10, depending upon the quantity and temperature at which it could be introduced, then of course, the amount of thermal energy to be imparted to the recirculated liquid and the quantity of recirculated liquid which would have to be recycled would, of course, be minimized. Of course, if enough fresh steam were introduced into the first column 10, then a recirculating liquid would not necessarily need be employed.

If it is desirable to separate the dry flash vapors from the wet flash vapors, a separate knock-out pot can be used which would separate the vapor from the liquid that is leaving the evaporator 24. The vapor can be directed to a separate dry condenser followed by a dry collecting tank; and the liquid, which is separated from the vapor in the knock-out pot, can be directed to the first stage distillation column 10 and proceed as described above. Or alternatively, live steam may be introduced to the fresh feed stream during evaporation for a complete wet flash system, using additional steam for the stripping operation in the second stage distillation column, and a smaller recirculation rate in the first stage distillation column. The combined vapor and liquid would enter the first stage distillation column and continue as described above. Also, the cold feed stream could be introduced directly from the feed tank 22 into the first stage distillation column and proceed as described above with the recirculation then being increased as required to supply the necessary heat input for the wet flash. The trichlorethylene recovered may, depending upon its ultimate use, have stabilizers and/or inhibitors added thereto in amounts for example, of 0.001 to 1.0 percent by weight. The flow rates, temperatures, and pressures of the processed fluid streams are of course interrelated and will vary with the operating conditions. If operating at atmospheric pressure with the trichlorethylene having a volume percent of between about 40 to 90 percent in the oil, the feed temperature of the stream entering the first stage may range between about 70° to 230°F with a liquid recirculation temperature of about 240° with a volume or flow rate preferably sufficient to raise the temperature of the feed stream in the first stage to about 238°F. The decomposition temperature of the trichlorethylene when operating at atmospheric pressure is about 265°F. In the prior description and the following example the column operating temperatures are approximately 25°F below this temperature to ensure that there is no decomposition reaction. If desired, the operating temperatures could more closely approach the 265°F decomposition temperature. The decomposition temperature is that temperature of the trichlorethylene at atmospheric pressure above which explosions occur and poisonous gases are formed in the presence of oxygen and water.

The operation of our invention will be described in reference to the processing of 200 gallons per hour of metal degreasing sludge in a combination evaporation-distillation trichlorethylene recovery unit operated at atmospheric pressure.

Two thousand, one hundred and forty pounds per hour of degreasing plant sludge containing 70 percent by volume trichlorethylene in lard oil having a free fatty acid content of from 10–25 percent by volume with $C_6$–$C_{24}$ length of the saturated acids and $C_{14}$–$C_{22}$ of the unsaturated acids is pumped from sludge tank 22. It enters the forced circulation long tube evaporator 24 at ambient temperature and 1,310 pounds per hour of the feed is vaporized as essentially pure trichlorethylene with the balance of the oil and trichlorethylene going through as liquid. The liquid and vapor stream which is at approximately 230°F enters the 1 foot diameter first stage distillation column 10 and the 830 pounds of liquid which contains approximately 35 volume percent trichlorethylene drops onto the distillation tray through the direct contact heat exchange system 14 where it is wet flashed to approximately 6 volume percent trichlorethylene by the 275 pounds per hour of the steam which comes from the second stage distillation column 12.

The heat needed to produce the wet flashing is provided by approximately 10,000 pounds per hour of 6 percent trichlorethylene 94 percent oil solution which also falls on the tray at 232°F. The equilibrium temperature of this liquid which falls through the downcomer is at approximately 232°F and falls to the liquid holdup section 20 of the first stage distillation column 10. This liquid is then pumped through the heat exchanger 40 where it is reheated to 238°F and recirculated back to the nozzle header 50 of the first stage distillation column 10. It falls through a four foot packed section 14 of the first stage distillation column which is provided to distribute the liquid evenly, to remove any liquid droplets which may be entrained in the vapor going through it, and to provide the contact time required for heat exchange. Five hundred pounds per hour is removed via liquid level controller 52 and enters the 1 foot diameter second stage distillation column 12. Column 12 is equipped with 12 bubble cap trays or 10 to 20 distillation trays, depending upon the type used. This column can also be equipped with 15 to 20 feet of packing depending on the type of packing material used. The liquid accumulates in the liquid holdup section 21 of the second stage distillation column and pump 56 recirculates approximately 500 pounds per hour of liquid through heat exchanger 58 where it is heated to 238°F to make up for radiation losses. Four hundred and fifty pounds per hour of stripped oil containing less than 50 PPM of trichlorethylene are removed as finished oil via liquid level controller 62. The 260 to 300 pounds per hour of stripping steam enters the bottom of the second stage stripping column 12 through the sparging system 66 via flow controller 64.

All of the trichlorethylene vapor generated in the system, the 1,310 pounds per hour from the evaporator 24, the 334 pounds per hour wet flashed in the first stage distillation column 10, and the 46 pounds per hour stripped in the second stage distillation column 12 combined with the 275 pounds per hour of steam which is admitted into the system through sparger 66 located at the bottom of the second stage distillation column 12 leave the top of the first stage distillation column. The 1,690 pounds per hour of trichlorethylene vapor together with the 275 pounds per hour of steam leave this column at 235°F where they enter the shell side of the shell and tube condenser 34. Cooling water entering at 70° to 90°F and flowing through the tubes cools the trichlorethylene and steam vapors, condenses them, and then cools the liquid which is formed to 100° to 120°F. One hundred and seventy-two gallons per hour of the condensed and cooled two-phase liquid system consisting of 139 gallons of trichlorethylene and 33 gallons of water enter the decanter 36 at 100° to 120°F. The heavier trichlorethylene drops to the bottom of the decanter into the boot 38 while the lighter water flows over the internal baffle and out of the top of the decanter. One hundred thirty-nine gallons per hour of 99 percent + trichlorethylene at 100° to 120°F leave the system as product trichlorethylene and 33 gallons of the water layer, containing stabilizers, inhibitors, and some trichlorethylene, flow to water storage. The recovered trichlorethylene has a boiling point of from 86.5° to 87.9°C and a specific gravity of 1.455 to 1.462 at 25°/25 C.

Having described our invention, what we now claim is:

1. A process for the recovery of a halocarbon from a halocarbon-oil mixture which comprises:
   a. contacting the mixture with a heat-exchange medium to volatize at least a portion of the halocarbon to form a vapor portion;
   b. placing subsequently the contacted mixture of step (a) in intimate contact with:
      1. a recycled heated liquid stream; and
      2. a separate heat exchange carrier fluid immiscible with the halocarbon to lower the partial pressure of the halocarbon whereby said halocarbon is volatilized;
   c. forming a vapor stream containing the halocarbon and the carrier fluid; and a stripped liquid stream;
   d. removing the vapor stream;
   e. collecting the liquid stream;
   f. removing at least a portion of said liquid stream;
   g. imparting thermal energy to heat said removed liquid stream;
   h. recycling said heated liquid stream; and
   i. placing said heated recycled liquid stream in intimate contact with the mixture of step (b).

2. The process of claim 1 wherein the carrier fluid is steam.

3. The process of claim 1 wherein the carrier fluid comprises steam and a halocarbon.

4. The process of claim 1 wherein the halocarbon is a chlorinated hydrocarbon.

5. The process of claim 4 wherein said chlorinated hydrocarbon is trichlorethylene.

6. The process of claim 1 which includes:
   collecting the vapor stream of step (c);
   condensing the vapor stream to form two immiscible liquid layers comprising the carrier fluid and the halocarbon; and
   separating the immiscible carrier fluid from the halocarbon.

7. The process of claim 1 which includes separating the vapor portion prior to contacting the mixture with the heated liquid stream and the carrier fluid.

8. The process of claim 1 wherein the nonremoved portion of the liquid stream of step (f) is contacted with a separate heat exchange medium to form a liquid stream comprising essentially the oils and a vapor stream comprising the halocarbon.

9. The process of claim 8 which includes forming the vapor stream comprising the halocarbon by steam distillation.

10. The method of claim 1, which includes:
controlling the rate and amount of the recycling of the heated liquid stream to provide a heat input to the mixture without exceeding the decomposition temperature of the halocarbon in the mixture.

11. A process for the separation and recovery of a halocarbon and oil from a concentrated waste sludge mixture of such halocarbon and oil, the halocarbon subject to decomposition at elevated temperatures, which process comprises:
   a. evaporating a concentrated halocarbon-oil sludge mixture to form a vapor-liquid stream;
   b. introducing the vapor-liquid stream into a first stage distillation column, the column divided into an upper vapor portion and lower liquid portion, the vapor-liquid stream being introduced into the upper vapor portion of the column to provide a first vapor stream and a first liquid stream;
   c. introducing a portion of the first liquid stream into a second distillation column having an upper vapor portion and a lower liquid portion to provide a second vapor stream and a second liquid stream;
   d. recovering as a liquid bottom stream from the second column the oil;
   e. introducing the second vapor stream into the lower liquid portion of the first distillation column to admix said stream with the first liquid stream;
   f. removing a vapor stream comprising the first and second vapor streams from the upper vapor portion of the first distillation column, the stream containing essentially water and the halocarbon;
   g. condensing the vapor stream containing the water and halocarbon removed from the upper vapor portion of the first column, and recovering the halocarbon from said condensed mixture; and
   h. recycling a portion of the first liquid stream from the liquid portion of the first distillation column to the vapor portion of the first distillation column, the rate and amount of recycling sufficient to provide a heat input to a majority of the halocarbon introduced into the upper vapor section of the first distillation column without exceeding the decomposition temperature of the halocarbon in such vapor section.

12. The process of claim 11 wherein the halocarbon is trichlorethylene.

13. The process of claim 11 which includes maintaining all heated surfaces in the first and second distillation columns at a temperature not to exceed 265°F.

14. The process of claim 11 which includes maintaining the temperature in the first and second stage distillation columns between 80° and 240°F.

15. The process of claim 11 which includes evaporating the liquid introduced into the second stage distillation column by steam distillation.

16. The process of claim 11 which includes introducing the recycled first liquid stream to the upper vapor portion of the first column by spraying said liquid stream onto a packed section of said column.

17. The process of claim 11 wherein the concentrated halocarbon-oil mixture comprises from about 10 to 90 percent by volume of halocarbon.

18. The process of claim 11 wherein the halocarbon is trichlorethylene and the oil is lard oil.

19. The process of claim 18 wherein the trichlorethylene-lard oil mixture is introduced into the first stage distillation column at a temperature of between 70° to 230°F and the recycled first liquid stream is introduced into the upper vapor portion of the first stage distillation column at a temperature not greater than 240°F.

20. The process of claim 11 wherein the halocarbon has a decomposition temperature of about 265°F at atmospheric pressure and which includes recycling the first liquid stream from the lower liquid portion to the upper vapor portion of the first stage distillation column at a temperature of not greater than 240°F in an amount sufficient to raise the temperature of the mixture in the upper vapor portion of the first stage distillation column to a temperature of between 232° to 238°F.

21. A process for the separation of trichlorethylene from a trichlorethylene-oil mixture, which process comprises:
   a. placing the mixture in intimate contact with a liquid heat exchange medium, said liquid heat exchange medium at a temperature below that of the thermal decomposition temperature of the trichlorethylene and in intimate contact with a separate heat-exchange carrier fluid which comprises steam and trichlorethylene to lower the partial pressure of the trichlorethylene;
   b. forming a first vapor stream containing the trichlorethylene and the steam and a liquid stream containing trichlorethylene and oil;
   c. removing a first portion of said liquid stream;
   d. imparting thermal energy to said liquid stream at a temperature below the thermal decomposition temperature of the trichlorethylene;
   e. placing said heated liquid stream in intimate contact with the mixture;
   f. removing a second portion of said liquid stream;
   g. evaporating from said liquid stream, by steam distillation, trichlorethylene to form the separate heat-exchange carrier fluid comprising trichlorethylene and steam;
   h. forming a liquid stream containing essentially the oils; and
   i. contacting the mixture of step (a) with said separate heat-exchange carrier fluid comprising trichlorethylene and steam to lower the partial pressure of the trichlorethylene.

22. The method of claim 21 which includes evaporating the mixture to remove a portion of the trichlorethylene prior to contacting said feed stream with the liquid heat exchange medium and the carrier fluid.

23. A process for the recovery of a halocarbon from a halocarbon-oil mixture, which comprises:
   a. placing the mixture in intimate contact simultaneously with:
      1. a recycled heated liquid stream; and
      2. a separate stream of steam immiscible with the halocarbon to lower the partial pressure of the halocarbon, whereby said halocarbon is volatilized;
   b. forming a vapor stream containing the halocarbon and the steam; and a stripped liquid stream;
   c. removing the vapor stream;
   d. collecting the liquid stream;
   e. removing at least a portion of said liquid stream;
   f. imparting thermal energy to heat said removed liquid stream;
   g. recycling said heated liquid stream; and
   h. placing said heated recycled liquid stream in intimate contact with the mixture.

24. The process of claim 23 wherein the halocarbon is a chlorinated hydrocarbon.

25. The process of claim 23 which includes:
   collecting the vapor stream of step (b);
   condensing the vapor stream to form two immiscible liquid layers comprising condensed steam and the halocarbon; and
   separating the condensed steam from the halocarbon.

26. The process of claim 23 which includes:
   contacting the mixture with a heat exchange medium to volatilize at least a portion of the halocarbon to form a vapor portion prior to contacting said mixture with the steam and the recycled heated liquid stream.

27. The process of claim 26 which includes separating the vapor portion prior to contacting the mixture with the heated liquid stream and the steam.

28. The process of claim 23 wherein nonremoved portion of the liquid stream of step (d) is contacted with a separate heat exchange medium to form a liquid stream comprising essentially the oils and a vapor stream comprising the halocarbon.

29. The process of claim 28 which includes forming the vapor stream comprising the halocarbon by steam distillation.

30. The method of claim 23, which includes:
   controlling the rate and amount of recycling of the heated liquid stream to provide a heat input to the mixture without exceeding the decomposition temperature of the halocarbon in the mixture.

* * * * *